(12) United States Patent
Kawada (10) Patent No.: US 10,250,408 B2
(45) Date of Patent: Apr. 2, 2019

(54) COMMUNICATION DEVICE

(71) Applicant: DENSO CORPORATION, Kariya, Aichi-pref. (JP)

(72) Inventor: Hiroyuki Kawada, Kariya (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 15/420,189

(22) Filed: Jan. 31, 2017

(65) Prior Publication Data

US 2017/0237690 A1    Aug. 17, 2017

(30) Foreign Application Priority Data

Feb. 11, 2016    (JP) .................................. 2016-24242

(51) Int. Cl.
| | |
|---|---|
| *H04L 12/46* | (2006.01) |
| *H04L 12/66* | (2006.01) |
| *H04L 12/28* | (2006.01) |
| *H04L 12/40* | (2006.01) |

(52) U.S. Cl.
CPC .......... *H04L 12/4625* (2013.01); *H04L 12/28* (2013.01); *H04L 12/40189* (2013.01); *H04L 12/46* (2013.01); *H04L 12/66* (2013.01)

(58) Field of Classification Search
CPC ............... H04L 12/66; H04L 12/40189; H04L 12/4625; H04L 12/46; H04L 12/28
See application file for complete search history.

(56) References Cited

U.S. PATENT DOCUMENTS

2015/0019897 A1* 1/2015 Horihata ........... H04L 12/40039
                                                   713/324
2015/0358351 A1* 12/2015 Otsuka ................ H04L 12/4625
                                                   726/23

FOREIGN PATENT DOCUMENTS

| JP | 2001-237889 A | 8/2001 |
|---|---|---|
| JP | 2002-332910 A | 11/2002 |
| JP | 2008-271040 A | 11/2008 |

* cited by examiner

*Primary Examiner* — Mewale A Ambaye
(74) *Attorney, Agent, or Firm* — Posz Law Group, PLC (57) ABSTRACT

A communication device includes a plurality of controllers, a plurality of buses that transmit transmission information, and a gateway to which the plurality of buses are collectively connected. Each of the plurality of controllers has a pattern table that defines, for each piece of the transmission information, a transmission bus pattern, and controls the input and output of the transmission information according to the pattern table. Each of the plurality of controllers is connected to at least two buses, and outputs, to the gateway via all of the connected buses, check information for a confirmation of connections to the connected buses. The gateway determines an interrupted bus from which no check information is input, and outputs, to each of the plurality of controllers, a route switch instruction instructing use of a pattern table that does not include the interrupted bus(es).

9 Claims, 8 Drawing Sheets

| | BEFORE CHANGE | AFTER CHANGE |
|---|---|---|
| ECU#1 | ROUTING INDEX : 0x00<br>1ST FRAME — BUS#1<br>2ND FRAME — BUS#2<br>3RD FRAME — BUS#2 | ROUTING INDEX : 0x03<br>1ST FRAME — BUS#1<br>2ND FRAME — BUS#2<br>3RD FRAME — BUS#1 |
| ECU#2 | ROUTING INDEX : 0x00<br>1ST FRAME — BUS#3<br>2ND FRAME — BUS#3<br>3RD FRAME — BUS#2 | ROUTING INDEX : 0x03<br>1ST FRAME — BUS#2<br>2ND FRAME — BUS#2<br>3RD FRAME — BUS#2 |

| | BEFORE CHANGE | | AFTER CHANGE | |
|---|---|---|---|---|
| ECU#1 | ROUTING INDEX : 0x03 | | ROUTING INDEX : 0xFF | |
| | 1ST FRAME | BUS#1 | 1ST FRAME | BUS#2 |
| | 2ND FRAME | BUS#2 | 2ND FRAME | BUS#2 |
| | 3RD FRAME | BUS#1 | 3RD FRAME | BUS#2 |

FIG. 13

COMMUNICATION DEVICE

CROSS REFERENCE TO RELATED APPLICATION

The present application is based on and claims the benefit of priority of Japanese Patent Application No. 2016-024242, filed on Feb. 11, 2016, the disclosure of which is incorporated herein by reference.

TECHNICAL FIELD

The present disclosure generally relates to a communication device that controls communication of a control device that is connected to two or more buses.

BACKGROUND INFORMATION

A patent document, Japanese Patent Laid-Open No. 2008-271040 (Patent document 1) listed below discloses a route switching scheme that switches one bus to the other, i.e., to an alternative, bus, when one bus has abnormality and becomes interrupted, under control of a communication device that controls communication of plural Electronic Control Units (ECU) that are respectively connected to both of two specific buses. Such a communication device enables the communication via the alternative bus by limiting a data amount of the communication via the alternative bus to the minimum necessary amount, for avoiding an exclusive use of the alternative bus by only one ECU and for preventing an overload/high-load of the alternative bus.

However, the communication device in the patent document 1 is effective only when all of the ECUs are connected to two buses, which may put some restrictions on the bus structure. Further, when the alternative bus is used, the data amount is restricted.

SUMMARY

It is an object of the present disclosure to provide a communication device that enables a flexible bus structure configuration while easing a data amount restriction on a data transmission of a control device that is connected to the flexibly-structured buses.

In the following disclosure, technical features are devised to appropriately enable the above-described goals. The claim elements and the components are associated by the numerals in the parentheses, but not in a limiting manner that limits the association only to the designated components or the like.

In an aspect of the present disclosure, a communication device includes a plurality of controllers, a plurality of buses that transmit transmission information input to and output from the plurality of controllers, and a gateway connected collectively to the plurality of buses and instructing at least one of the plurality of controllers to use a specific one or more of the plurality of buses for a transmission of the transmission information. The plurality of controllers has a pattern table that defines a bus pattern of specifying at least which one of the plurality of buses is to be used for the transmission of the transmission information, and for an input and an output of the transmission information to or from the plurality of controllers, according to the defined bus pattern. Also, the plurality of controllers is connected to at least two of the plurality of buses, and outputs check information to the gateway to confirm connection via all of the connected buses. Further, the gateway determines an interrupted bus from which the check information is withheld, and outputs to at least one of the plurality of controllers a route switch instruction that instructs a use of the pattern table that defines the bus pattern that is without the interrupted bus.

According to the above, the abnormality that causes an interruption of the bus is worked around by switching the routing of the transmission information, i.e., by not using the interrupted bus for the input and output of the transmission information, which eases/lightens the data amount restriction conventionally put on the controllers. Further, for achieving the above effects, it only requires the controllers to be connected to two out of many buses, which makes the bus structure much more flexible in comparison to the conventional bus structure, i.e., in comparison to the conventional connection of all controllers to two specific buses.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiment of the invention is described based on the drawings In each of the following drawings, identical codes are assigned to the same or equivalent components.

When a part of the configuration is described in an embodiment, the rest of the configuration is basically the same as the preceding embodiment(s). The embodiments are basically arbitrarily combinable unless otherwise described, i.e., besides the explicitly-described combinations in the embodiment(s).

(First Embodiment)

Figure 1:
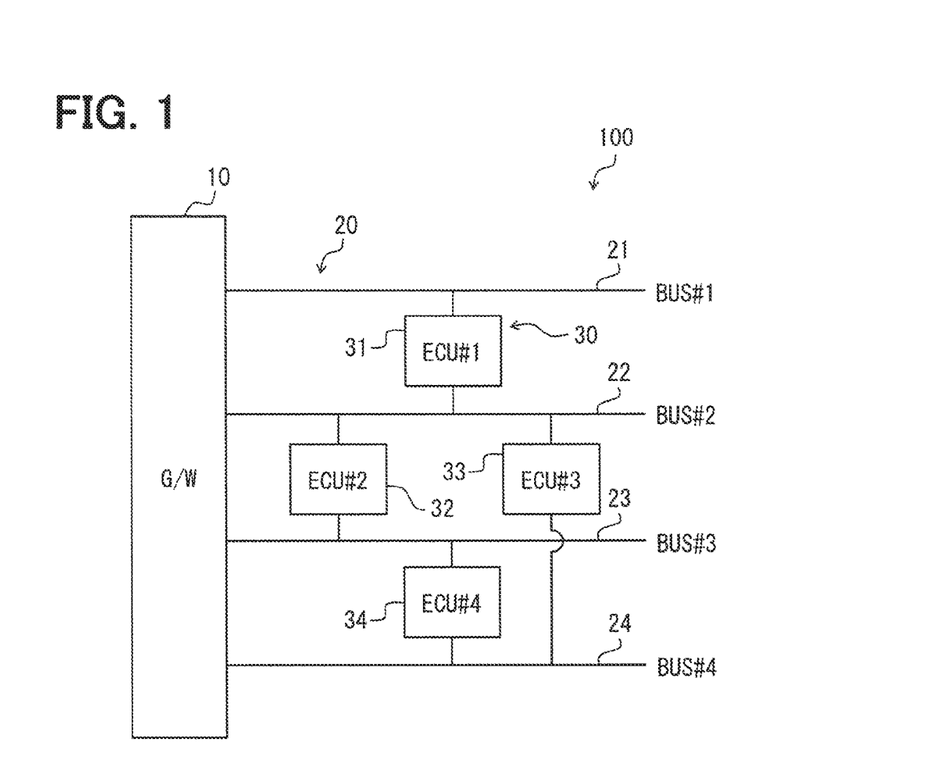
FIG. 1 is a block diagram of a communication device in a first embodiment of the present disclosure.
Figure 2:
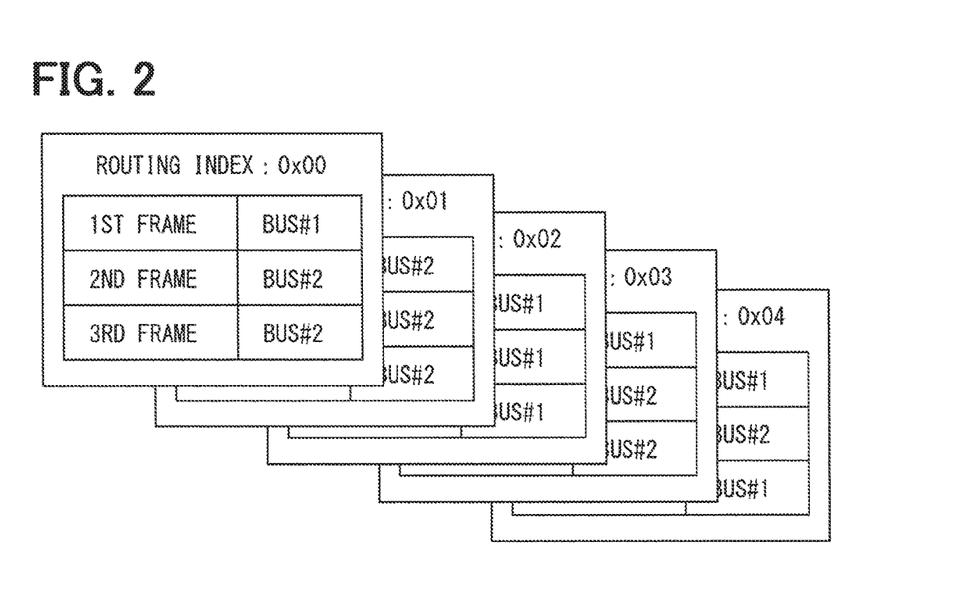
FIG. 2 is an illustration of pattern tables.

The first, with reference to FIGS. 1 and 2, the configuration of a communication device concerning the present embodiment is described.

The communication device in the present embodiment is a device including a gateway ECU that controls a "traffic" of the communication network for the data transmission performed by plural ECUS disposed in, for example, an automotive vehicle.

As shown in FIG. 1 a communication device 100 is provided with a gateway section 10 that is equivalent to the above-mentioned gateway ECU, two or more (i.e., plural) buses 20 connected to the gateway section 10, and two or more (i.e., plural) controllers 30 connected to the buses 20.

The gateway section 10 is a device that controls and adjusts the use of the buses 20, i.e., which one of the buses 20 the controller 30 should use for the transmission of the transmission data.

The gateway section 10 is connected to all of the buses 20 shown in FIG. 1, and is connected to all of the controllers 30 (31-34) via these buses 20. The gateway section 10 monitors the abnormality of the bus 20 based on the below-mentioned check information inputted from the controller 30. Then, according to the state of the bus(es) 20, the use state of the bus 20 stored in the controller 30 is changed, and the communication network is "traffic-controlled". More practical operations of the gateway section 10 are described later in the present embodiment.

The bus 20 is a signal line, and includes an address bus, a data bus, and a control bus. For example, the bus 20 in the present embodiment is made up from the four buses. That is, the bus 20 includes a first bus 21, a second bus 22, a third bus 23, and a fourth bus 24. All buses 21-24 are collectively connected to the gateway section 10.

The controller 30 is a so-called electronic control unit (ECU) such as, for example, an engine ECU, a body ECU, a safety control ECU, and the like. The controller 30 in the present embodiment is, for example, implemented as four different ECUS, i.e., as a first ECU 31, a second ECU 32, a third ECU 33, and a fourth ECU 34.

Each of the controllers 30 is connected to at least two buses 20. According to the present embodiment, the first ECU 31 is connected to the first bus 21 and to the second bus 32 as shown in FIG. 1. The second ECU 32 is connected to the second bus 22 and to the third bus 23. The third ECU 33 is connected to the second bus 22 and to the fourth bus 24. The fourth ECU 34 is connected to the third bus 23 and to the fourth bus 24.

Each of the controllers 30 has a pattern table that specifies the buses 20 that are used by the respective controllers 30 to transmit the information, i.e., a "frame".

The pattern table in the first ECU 31 is illustrated in FIG. 2. The first ECU 31 has at least five pattern tables, and determines which one of the buses 20 to use for the transmission of the frame with reference to the pattern table according to a routing index specified by the gateway section 10.

For example, when the routing index specified by the gateway section 10 is "0x00", transmission of the first frame is assigned to the first bus 21, transmission of the second frame is assigned to the second bus 22, and transmission of the third frame is assigned to the second bus 22.

When the routing index is set to "0x01" by the gateway section 10, transmission of the first frame is assigned to the second bus 22, transmission of the second frame is assigned to the second bus 22, and transmission of the third frame is assigned to the second bus 22.

The second ECU 32, the third ECU 33, and the fourth ECU 34 also respectively have at least five pattern tables, and respectively determine the buses 20 to be used for the transmission of the frame with reference to the pattern table according to the routing index specified by the gateway section 10. The "frame" in the embodiments is equivalent to transmission information in the claims.

Further, each of the controllers 30 routinely, i.e., always, outputs the check information to the gateway section 10 via the connected buses 20. The check information is a signal for checking a communicable connection between the controller 30 and the gateway section 10. Therefore, as long as the check information is unique to each of the controllers 30, the contents of the check information do not matter. The gateway section 10 monitors the check information and checks the interruption, or a "cut off", of the buses 20.

More practically, for example, the check information unique to the first ECU 31 is inputted (i.e., comes in) from the first bus 21 and from the second bus 22 to the gateway section 10 when the two buses 21 and 22 are normal, since the first ECU 31 is connected to the first bus 21 and to the second bus 22.

Here, when the first bus 21 is interrupted, the check information is inputted only from the second bus 22. In such case, the gateway section 10 recognizes/determines the first bus 21 as interrupted based on non-detection of the check information from the first bus 21 (i.e., the check information is withheld from being sent from the first bus 21).

Next, with reference to FIGS. 3-12, a more concrete operation flow and operation effects of the communication device 100 in the present embodiment are described.

Figure 3:
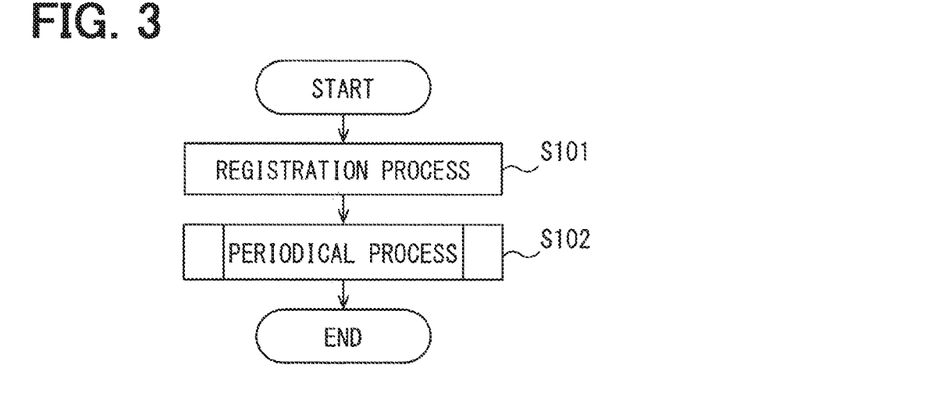
FIG. 3 is a flowchart of a main routine regarding an operation of the communication device.

As shown in FIG. 3, Step S101 is performed first. In Step S101, the gateway section 10 registers the controllers 30 in association with the connected buses 20 to a memory in the gateway section 10. This registration process is performed based on the check information outputted from the controller 30. By such registration process, registration of the controllers (i.e., ECUS) 31-34 is complete, in terms of which of the buses 20 the controllers 31-34 use for the connection to the gateway section 10. Then, the registered controller 30 serves as an object of a route switch instruction mentioned later, and the buses 20 serve as an object of abnormality detection.

Subsequently, Step S102 is performed. Step S102 is a periodical process in which the gateway section 10 performs abnormality detection of the buses 20, and sends the route switch instruction to the controller 30. The details of Step S102 are described with reference to FIGS. 4-8.

Figure 4:
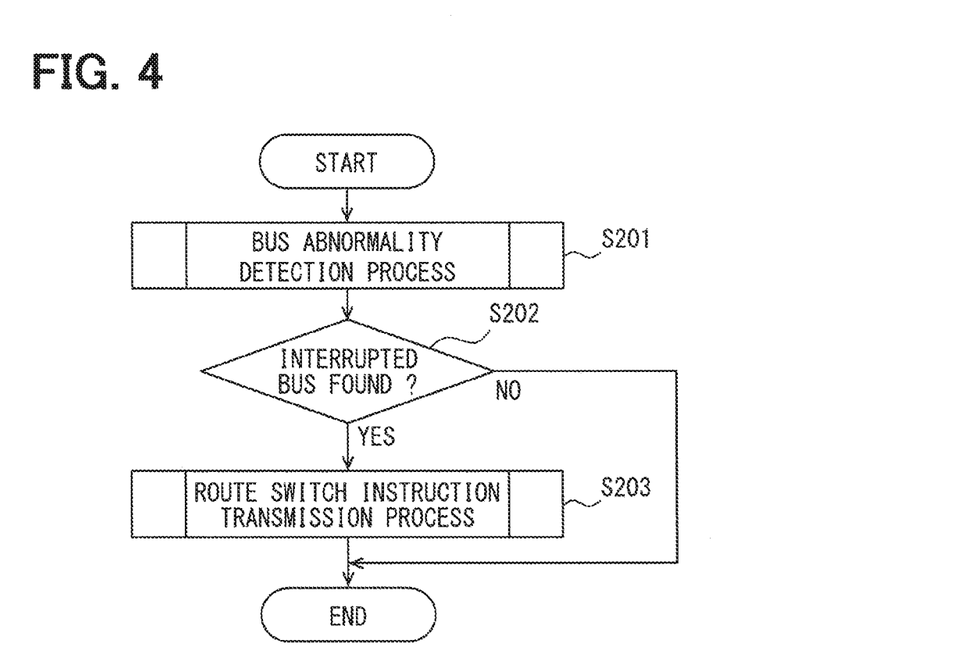
FIG. 4 is a flowchart of a periodical process describing contents of the periodical process.

In the periodical process, as shown in FIG. 4, Step S201 is performed first. In Step S201, the gateway section 10 performs a process to detect abnormality of the buses 20.

Figure 5:
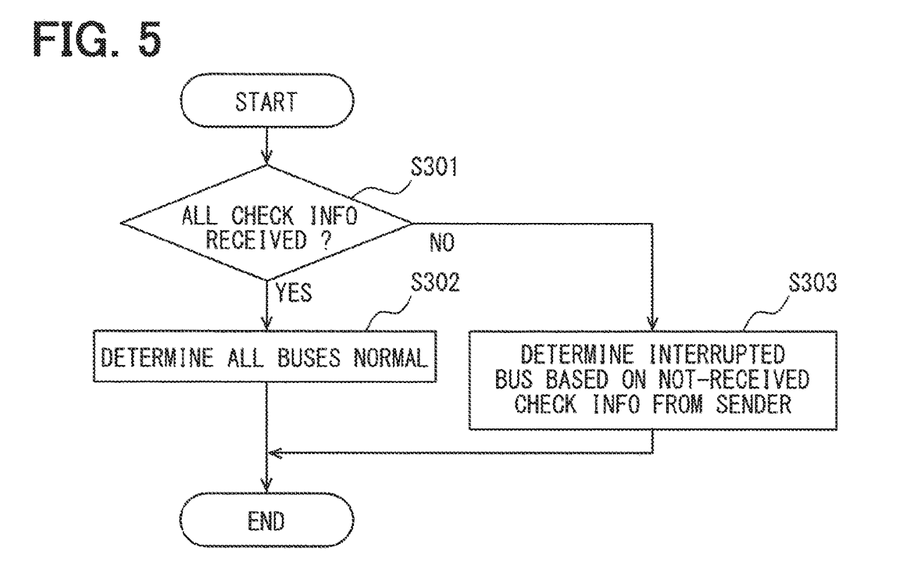
FIG. 5 is a flowchart of a bus abnormality detection process shown in FIG. 4.

In the process of S201, as shown in FIG. 5, Step S301 is performed first. In Step S301, the gateway section 10 determines whether the check information is inputted via all of the buses 20 from all of the registered controllers 30 that are registered in Step S101. When the check information is inputted to the gateway section 10 from all of the buses 20, Step S301 is determined as YES, and the process proceeds to Step S302.

In Step S302, the gateway section 10 determines that no abnormality is found about all the buses 20. Then, Step S201 is finished, and the process proceeds to Step S202 shown in FIG. 4.

In Step S202, the gateway section 10 determines whether there is any abnormal, i.e., interrupted, bus 20. Since, it is already determined in Step S302 that there is no abnormality, Step 202 is determined as NO, and the process of Step S102 shown in FIG. 3 is finished, and the entire routine is finished. If no abnormality is found in the buses 20, the route switch instruction will not be sent out.

On the other hand, if any one of the check information is determined as not being received in Step S301 of FIG. 5, S301 is determined as NO, and the process proceeds to Step S303.

In Step S303, the gateway section 10 determines that the bus 20 between the gateway section 10 and the controller 30 that is a sender of not-received check information is an interrupted bus.

Figure 6:
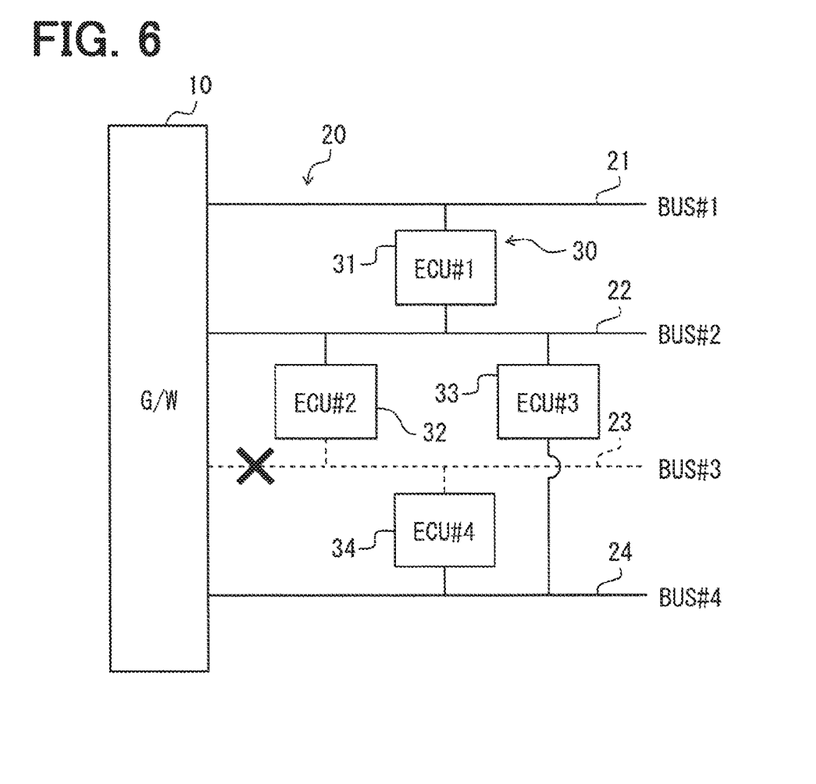
FIG. 6 is a block diagram of an example in which a third bus is an interrupted bus.

For example, as shown in FIG. 6, the check information that should have been inputted from the second ECU 32 via the third bus 23 and the check information that should have been inputted from the fourth ECU 34 via the third bus 23 have not yet been received by the gateway section 10, the gateway section 10 determines that the third bus 23 is an interrupted bus.

Step 201 is finished after such determination, and the process proceeds to Step S202 in FIG. 4.

In Step S202, which has already been described above, the gateway section 10 determines whether one or more of the buses 20 are respectively an interrupted bus. According to the present embodiment, since the third bus 23 is determined as the interrupted bus in Step S303, Step 202 is determined as YES, and the process proceeds to Step S203.

In Step S203, the gateway section 10 instructs the controller 30 to switch the transmission route of the frame (ROUTE SWITCH INSTRUCTION TRANSMISSION PROCESS). A more concrete operation flow is described with reference to FIG. 7.

Figure 7:
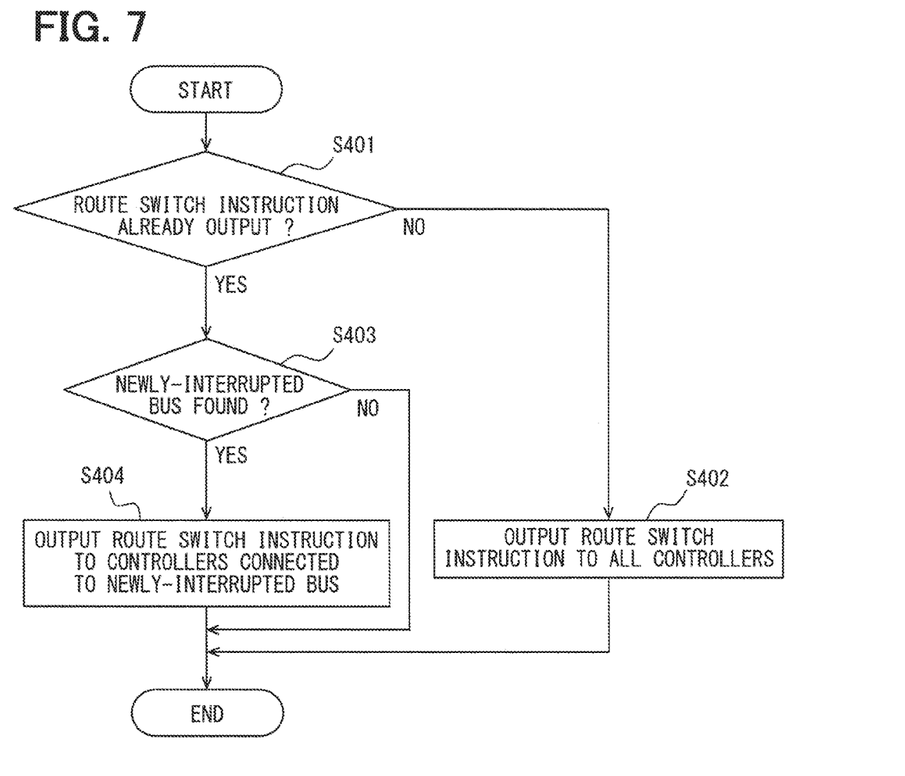
FIG. 7 is a flowchart of a route switch instruction transmission process shown in FIG. 4.

As shown in FIG. 7, Step S401 is performed first. In Step S401, it is determined whether the gateway section 10 has already outputted a route switch instruction. When outputting the route switch instruction for the first time, Step S401 is determined as NO, and the process proceeds to Step S402.

Figure 8:
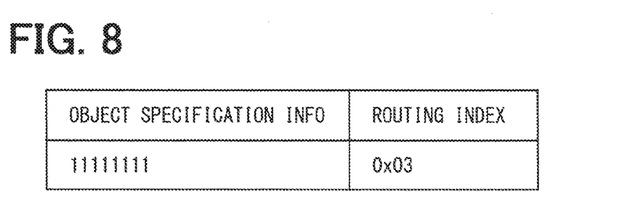
FIG. 8 is an illustration of contents of the route switch instruction that is output from a gateway section simultaneously to all controllers.

In Step S402, the gateway section 10 outputs the route switch instruction to all of the controllers 30. The route switch instruction includes (i) an object specification information that specifies an object controller 30 in which a pattern table is switched from one to the other, and (ii) a routing index after the switching of the pattern table. More specifically, as shown in FIG. 8, for example, the route switch instruction includes "11111111" as the object specification information and "0x03" as the routing index.

The object specification information is used by the controller 30 that has received the route switch instruction to determine whether the controller 30 itself is an object device of the instruction, i.e., is an object device in which a pattern table is switched from one to the other. When, for example, all bits of the object specification information are set to "1", it shows that all of the controllers 30 are the objects of the route switch instruction.

The routing index specifies a pattern table after the switching. As illustrated in FIG. 2, the controllers 30 in the present embodiment have at least five pattern tables, respectively, and those pattern tables respectively have the routing index of "0x00"-"0x04" and other index numbers.

The object controller 30 that has received the route switch instruction switches a pattern table from the current pattern table to the other pattern table having a routing index that is specified in the route switch instruction, for switching a pattern, i.e., a combination, of the buses 20 for the transmission of the frames.

In Step S402, the route switch instruction is outputted to all of the controllers 30 all at once as a single message, i.e., is simultaneously output to all controllers 30. Since the route switch instruction is outputted as a single message, such an output of the instruction does not put a too much load on the buses 20 for sending the route switch instruction to all of the controllers 30. The controller 30 that has received the route switch instruction switches the pattern table according to an operation flow mentioned later.

After Step S402, the periodical process comes to an end by finishing Step S203 of FIG. 4, in terms of performing the route switch instruction to the controllers 30.

Subsequently, with reference to FIGS. 9 and 10, the operation flow of the controller 30 at the time of receiving the route switch instruction is described.

Figure 9:
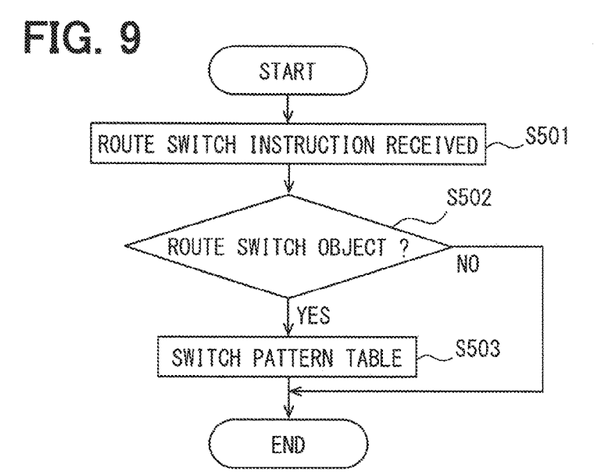
FIG. 9 is a flowchart of a process that is performed by a controller.

As shown in FIG. 9, Step S501 is performed first. In Step S501, the controller 30 receives the route switch instruction as illustrated in FIG. 8.

Then, Step S502 is performed. In Step S502, the controller 30 receiving the route switch instruction determines whether the controller 30 itself is an object device of the route switch instruction, i.e., is an object controller 30 in which a pattern table is switched from one to the other.

In an example shown in FIG. 8, since all the bits of the object specification information in the route switch instruction are "1", the instruction receiving controller 30 is an object device of the route switching, i.e., Step S502 is determined as YES.

On the other hand, when the instruction receiving controller 30 is not the object device of the route switching, Step S502 is determined as NO, and the operation flow is finished, and the switching of the route is not performed.

When Step S502 is determined as YES, the process proceeds to Step S503. In Step S503, the controller 30 switches/changes the pattern table. In an example of FIG. 8, the routing index in the route switch instruction is "0x03," Assuming that the routing index before the switching is "0x00", the pattern table is switched to a state of FIG. 10, by performing Step S503.

Figure 10:
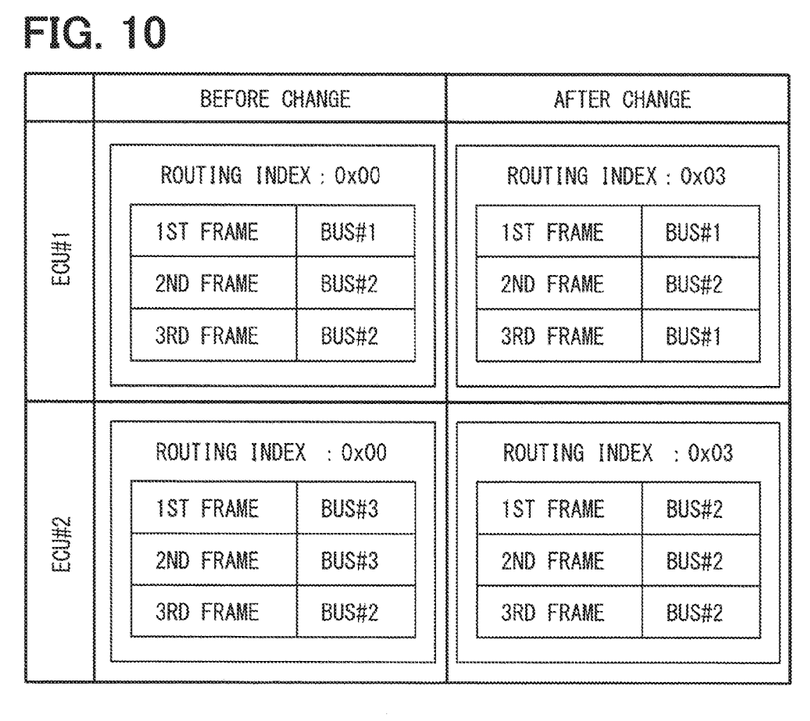
FIG. 10 is an illustration of an example of switching between the pattern tables after receiving the route switch instruction.

The pattern table in the second ECU 32 is, as shown in the lower part of FIG. 10, switched from one pattern (left one) to the other pattern (right one), i.e., the pattern on the left of FIG. 10 in which the transmission of the first and second frames is assigned to the third bus 23 is switched/changed to the pattern on the right of FIG. 10 in which the transmission of the first and second (i.e., all) frames is assigned to the second bus 22. Thereby, the communication network between the second ECU 32 and the gateway section 10 is secured/reserved.

On the other hand, as shown in the upper part of FIG. 10, the pattern table in the first ECU 31 is switched/changed from the left pattern to the right pattern, i.e., the left pattern in which the transmission of the third frame is assigned to the second bus 22 is switched to the right pattern in which the transmission of the third frame is assigned to the first bus 21.

Although the occupancy rate of the second bus 22 increases in the second ECU 32, the load of the second bus 22 is lightened by decreasing the transmission amount of the first ECU 31 via the second bus 22. That is, restriction on the frame transmission amount (i.e., restriction on a sending amount and a receiving amount of the frames) in both of the first ECU 31 and the second ECU 32 is reduced.

The operation flow of the controller 30 at the time of receiving the route switch instruction comes to an end after performing Step S503, which switches/changes the pattern table of the controller 30.

Note that, the route switch instruction transmission process, i.e., Step S203 in FIG. 4, may lead to S403 in case that the route switch instruction has already been outputted, i.e., transmitted, (i.e., when Step S401 of FIG. 7 is determined as YES). Then, the process proceeds to Step S403.

In Step S403, the gateway section 10 determines whether there is a newly-interrupted bus. The determination of Step S403 is performed based on the check information outputted from the controller 30, just like the determination of Step S301. If no newly-interrupted bus is found in Step S403, Step S403 is determined as NO, and the operation flow is finished, without outputting the route switch instruction (i.e., without switching/changing the pattern table).

Figure 11:
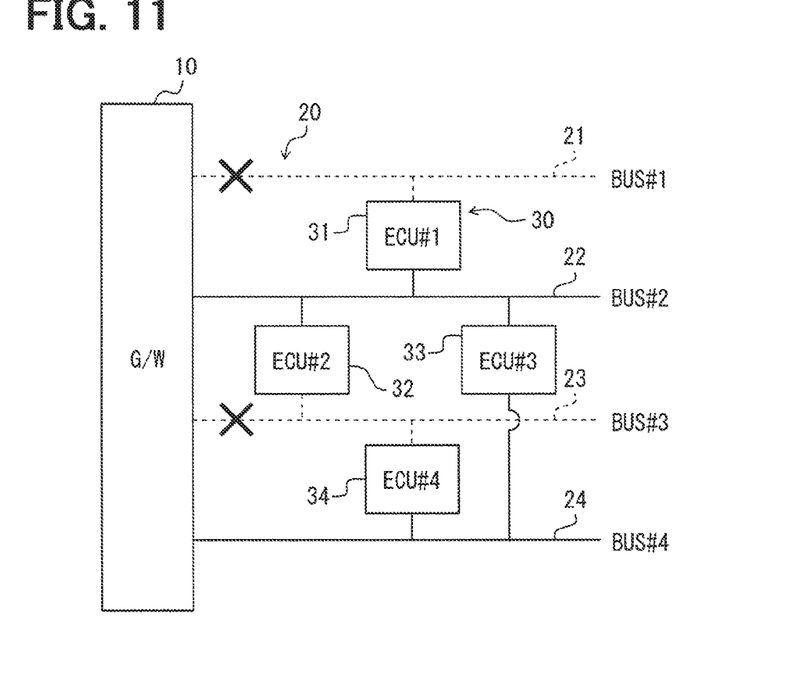
FIG. 11 is a block diagram of an example in which a first bus is an interrupted bus.

On the other hand, as shown in FIG. 11, in case that the first bus 21 becomes interrupted in addition to the third bus 23, the following routing scheme is adopted. That is, in such case, Step S403 is determined as YES, and the process proceeds to Step S404.

In Step S404, the gateway section 10 outputs the route switch instruction to the controller 30 that is connected to the newly-interrupted bus.

In this example, since the first bus 21 is newly interrupted, the gateway section 10 outputs the route switch instruction separately to the first ECU 31 that is connected to the first bus 21. When outputting the route switch instruction separately, it is not necessary for the route switch instruction to include the object specification information.

Figure 12:
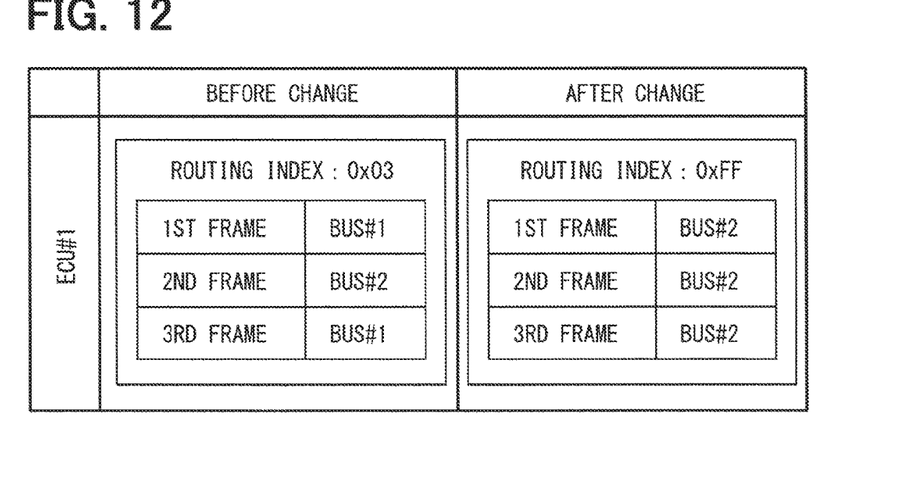
FIG. 12 is an illustration of an example of switching between the pattern tables after separately receiving the route switch instruction by a specific controller.

In Step S402 and Step 503, the routing index is already changed from "0x00" to "0x03", but the routing index is further changed in Step S404. More practically, as shown in FIG. 12, the routing index "0xFF" is now chosen, for not using the first bus 21 for the input and output of the frames to and from the first ECU 31, In other words, the routing index including only the second bus 22 is chosen. Thereby, all the frames can be outputted from and inputted to the first ECU 31, which prevents the loss of the frames, i.e., input/output to and from the first ECU 31 is appropriately performed.

(Second Embodiment)

In the above-described example of the first embodiment, when the first bus 21 is interrupted in addition to the third bus 23, the input to and the output from the first ECU 31 are all assigned to the second bus 22 by changing the routing index.

In such case, as shown by the lower part in FIG. 10 as well as by FIG. 12, the input of the frames to and the output of the frames from the first ECU 31 and the second ECU 32 all concentrate on the second bus 22.

Figure 13:
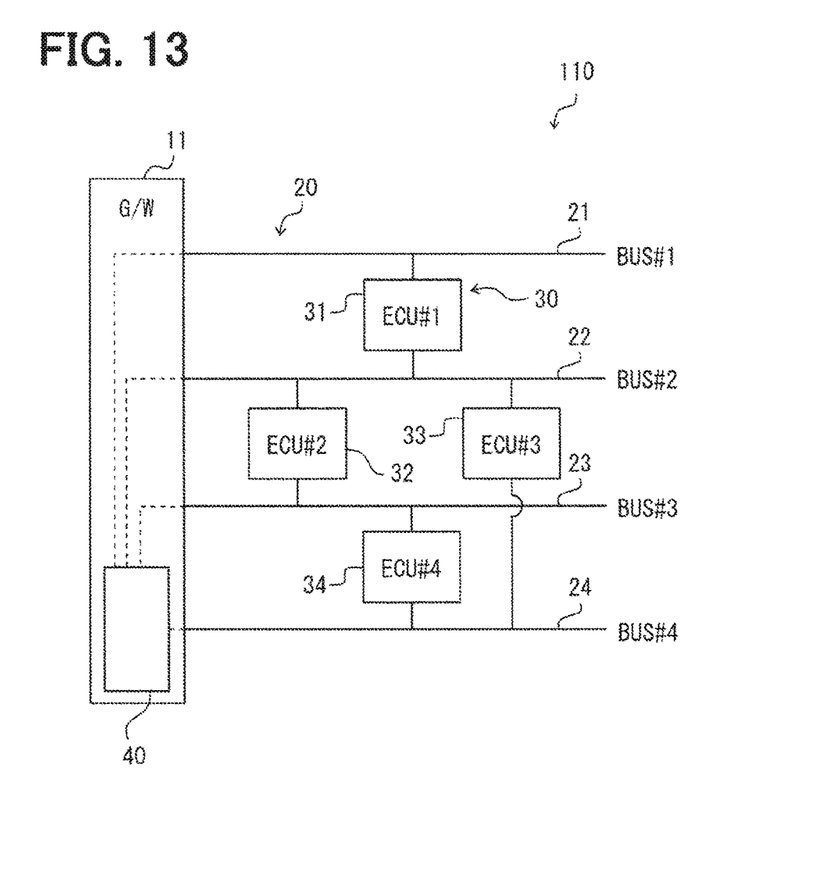
FIG. 13 is a block diagram of the communication device in a second embodiment of the present disclosure.

Thus, a gateway section 11 in a communication device 110 of the present embodiment is provided with a load detector 40 that detects a load of the bus 20, as shown in FIG. 13. Other than having the load detector 40, the configuration of the bus 20 and the controller 30 is the same as that of the first embodiment.

The load detector 40 is connected to all of the buses 20 that are connected to the gateway section 11, and monitors a frame flow rate, or a pattern table setting condition.

Figure 14:
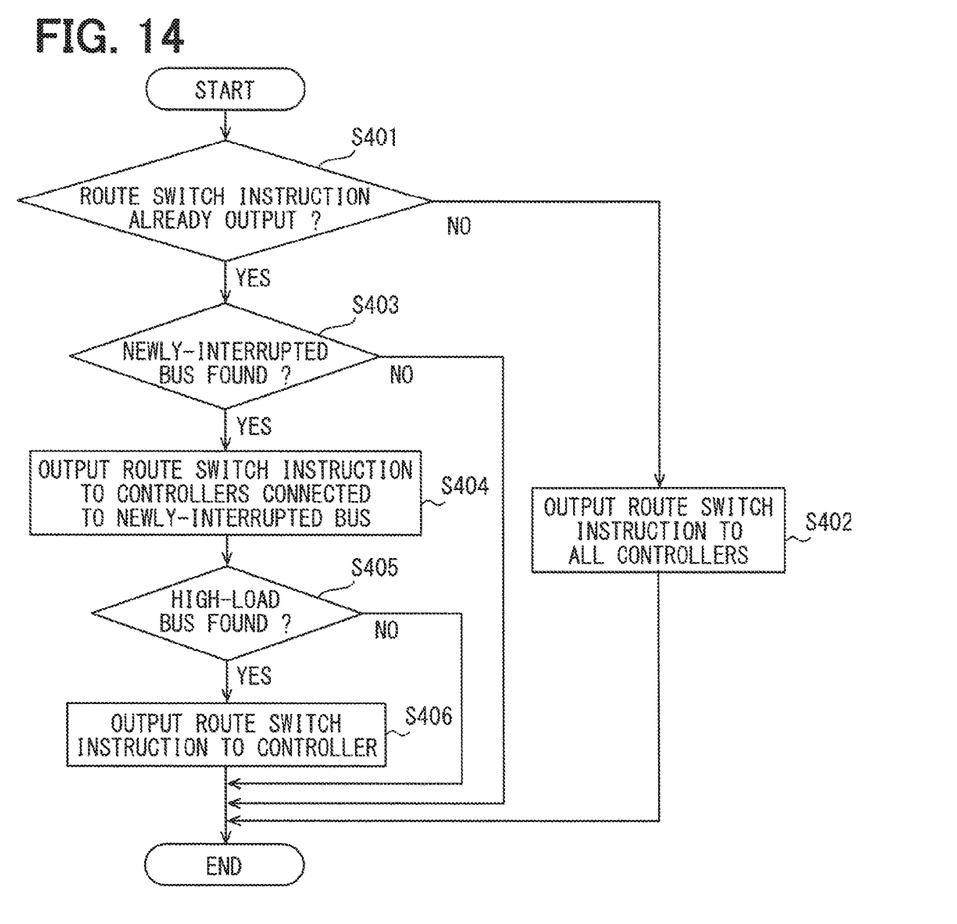
FIG. 14 is another flowchart of the route switch instruction transmission process modified from the one shown in FIG. 4.

The operation flow of the gateway section 11 having the load detector 40 is described with reference to FIG. 14.

The operation flow of the gateway section 11 is different from the one in FIG. 7 of the first embodiment by the following points. That is, the route switch instruction transmission process in Step S203 of FIG. 4 in the first embodiment is now modified to have Step S405 and Step S406 in addition to Steps S401 to Step S404 shown in FIG. 7.

When a newly-interrupted bus is found in Step S403 and the route switch instruction is outputted in Step S404, the process proceeds to Step S405. In Step S405, it is determined whether any one of the plural buses 20 has a high load, i.e., the load of the bus 20 is above a preset threshold.

As a result of output of the route switch instruction, the load of the second bus 22 may be higher than the load of the other buses, and such a high load situation of the second bus 22 may be detected by the load detector 40. When such a high load situation, i.e., a high-load bus 20, is detected by the load detector 40, Step S405 is determined as YES. In view of such a high load situation, the load detector 40 proposes, to the gateway section 11, an output of the route switch instruction for setting a pattern table that eases/lightens the high load, i.e., the occupancy rate, of the second bus 22. Then, the process proceeds to Step S406.

In Step S406, the gateway section 11 outputs the route switch instruction to the controller(s) 30 that is (are) connected to a high-load bus and an "alternative" bus, i.e., a bus other than the high-load bus. In the example of FIG. 13, from among the "high-load bus connected" controllers 30 that are connected to the second bus 22, the third ECU 33 has an alternative bus 20 (i.e., the fourth bus 24). Therefore, the gateway section 11 outputs the route switch instruction separately to the third ECU 33, and instructs a change of the pattern table.

Figure 15:
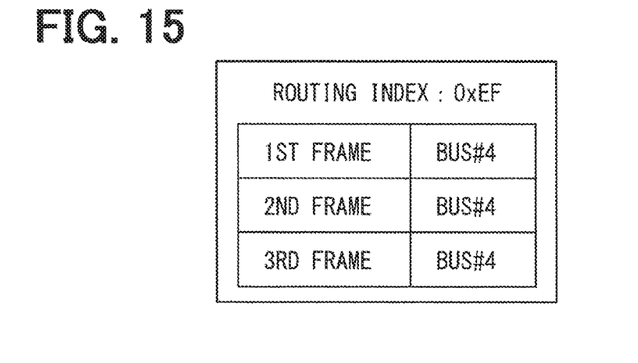
FIG. 15 is an illustration of an example of switching between the pattern tables after separately receiving the route switch instruction by the specific controller.

More practically, the route switch instruction instructs the third ECU 33 to change the pattern table to the one shown in FIG. 15. The routing index "0xEF" in the third ECU 33 may, for example, set a pattern table that inputs and outputs all frames via the fourth bus 24.

Note that, even in the above-described situation, low process priority frames from among the input/output frames to/From the third ECU 33 may be configured to be input to or output, i.e., routed, from the third ECU 33 to the gateway section 11 via the second bus 22, so that the load of the fourth bus 24 is lightened. What kind of pattern table should be specified may be determined based on the load of the buses 20 and the process priority of each frame.

When the gateway section 11 is equipped with the load detector 40 as shown by the communication device 110 in the present embodiment, a concentration of the input/output frame to a single bus is prevented, which eases/lightens the "otherwise-put" restriction of the frame transmission amount on the controller 30.

(Other Embodiments)

Although the present disclosure has been described in connection with preferred embodiment thereof with reference to the accompanying drawings, it is to be noted that various changes and modifications become apparent to those skilled in the art.

In each of the above-mentioned embodiments, the configuration of the connection between the buses 20 and the controllers 30 is only an example, and the configuration of the connection is not necessarily limited to such example.

In each of the above-mentioned embodiments, the controllers 30 are respectively connected to the two buses 20. However, the controllers 30 may also be connected to the three buses 20, or to the four or more buses 20.

Further, the number of the pattern tables in the controllers 30 is not limited to a specific number.

Further, the above embodiments describe examples of the in-vehicle controllers (i.e., ECUS) disposed in a vehicle. However, the communication devices 100, 110 may also be disposed in, for example, an unmanned plane, an air plane, a ship, or in other movable bodies and portable devices.

Such changes, modifications, and summarized schemes are to be understood as being within the scope of the present disclosure as defined by appended claims.

What is claimed is:

1. A communication device comprising:
   a plurality of controllers;
   a plurality of buses that transmit transmission information input to and output from the plurality of controllers; and
   a gateway connected collectively to the plurality of buses and instructing at least one of the plurality of controllers to use a specific one or more of the plurality of buses for a transmission of the transmission information, wherein
   the plurality of controllers has a pattern table that defines a bus pattern of specifying at least which one of the plurality of buses is to be used for the transmission of the transmission information, and for an input and an output of the transmission information to or from the plurality of controllers, according to the defined bus pattern,
   the plurality of controllers is connected to at least two of the plurality of buses, and outputs check information to the gateway to confirm connection via all of the connected buses, and
   the gateway determines an interrupted bus from which the check information is withheld, and outputs to at least one of the plurality of controllers a route switch instruction that instructs a use of the pattern table that defines the bus pattern that is without the interrupted bus.

2. The communication device of claim 1, wherein
   the route switch instruction includes object specification information specifying an object controller in which the pattern table is switched,
   the gateway outputs simultaneously to all of the plurality of controllers connected to the gateway a single route switch instruction for switching a routing, and
   the pattern table in the object controller specified by the object specification information is switched.

3. The communication device of claim 1, wherein
   the gateway outputs a route switch instruction separately to at least one of the plurality of controllers.

4. The communication device of claim 1 further comprising:
   a load detector in the gateway for detecting a load of each of the plurality of buses, wherein
   the gateway outputs the route switch instruction to at least one of the plurality of controllers to which a high-load bus that is loaded with an above-threshold load is connected, for instructing the at least one of the plurality of controllers to switch the pattern table to a different table to lighten an occupancy rate of the high-load bus.

5. The communication device of claim 1, wherein the gateway is separate from the plurality of controllers.

6. The communication device of claim 1, wherein the plurality of busses includes at least three busses.

7. A communication device comprising:
   a plurality of controllers;
   a plurality of buses that transmit transmission information input to and output from the plurality of controllers; and
   a gateway connected collectively to the plurality of buses and instructing each of the plurality of controllers to use a corresponding specific one or more of the plurality of buses for a transmission of the transmission information, wherein
   the plurality of controllers has a pattern table that defines a bus pattern of specifying at least which one of the plurality of buses is to be used for the transmission of the transmission information, and for an input and an output of the transmission information to or from the plurality of controllers, according to the defined bus pattern,
   the plurality of controllers is connected to at least two of the plurality of buses, and outputs check information to the gateway to confirm connection via all of the connected buses, and
   the gateway determines an interrupted bus from which the check information is withheld, and outputs to at least one of the plurality of controllers a route switch instruction that instructs a use of the pattern table that defines the bus pattern that is without the interrupted bus.

8. The communication device of claim 7, wherein the gateway is separate from the plurality of controllers.

9. The communication device of claim 7, wherein the plurality of busses includes at least three busses.

* * * * *